US012804570B2

(12) United States Patent
Ding

(10) Patent No.: US 12,804,570 B2
(45) Date of Patent: Nov. 17, 2026

(54) OUT-OF-SYNCHRONIZATION BASE STATION DETERMINING METHOD AND SERVER

(71) Applicant: HUAWEI TECHNOLOGIES CO., LTD., Shenzhen (CN)

(72) Inventor: Ding Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 252 days.

(21) Appl. No.: 18/740,418

(22) Filed: Jun. 11, 2024

(65) Prior Publication Data

US 2024/0334351 A1 Oct. 3, 2024

Related U.S. Application Data

(63) Continuation of application No. PCT/CN2021/137409, filed on Dec. 13, 2021.

(51) Int. Cl.
*H04W 56/00* (2009.01)
*H04W 88/08* (2009.01)

(52) U.S. Cl.
CPC .......... *H04W 56/001* (2013.01); *H04W 88/08* (2013.01)

(58) Field of Classification Search
CPC ............................ H04W 56/001; H04W 88/08
See application file for complete search history.

(56) References Cited

U.S. PATENT DOCUMENTS

2020/0015183 A1 1/2020 Ding et al.

FOREIGN PATENT DOCUMENTS

CN 11079885 A * 2/2020
CN 110798854 A 2/2020

OTHER PUBLICATIONS

3GPP TS 36.133 V17.3.0, "3rd Generation Partnership Project; Technical Specification Group Radio Access Network; Evolved Universal Terrestrial Radio Access (E-UTRA); Requirements for support of radio resource management (Release 17)," Sep. 2021, 2951 pages.

International Search Report and Written Opinion in International Appln. No. PCT/CN2021/137409, mailed on Sep. 2, 2022, 17 pages (with English translation).

Extended European Search Report in European Appln. No. 21967476.9, mailed on Jan. 8, 2025, 11 pages.

* cited by examiner

*Primary Examiner* — Brenda H Pham
(74) *Attorney, Agent, or Firm* — Fish & Richardson P.C.

(57) ABSTRACT

Example base station determining methods and example servers are disclosed, where the solution is used to determine an out-of-synchronization base station in a network. In one example, at least one synchronization domain is determined, where any two neighboring base stations in the synchronization domain are in a relative clock synchronization relationship. Then, a first synchronization domain is determined based on the at least one synchronization domain, where each base station in the first synchronization domain is a synchronization base station. A second synchronization domain that is in the at least one synchronization domain and that has a relative clock out-of-synchronization relationship with the first synchronization domain is then determined, to determine that each base station in the second synchronization domain is an out-of-synchronization base station.

20 Claims, 6 Drawing Sheets

OUT-OF-SYNCHRONIZATION BASE STATION DETERMINING METHOD AND SERVER

CROSS-REFERENCE TO RELATED APPLICATIONS

This application is a continuation of International Application No. PCT/CN2021/137409, filed on Dec. 13, 2021, the disclosure of which is hereby incorporated by reference in its entirety.

TECHNICAL FIELD

This application relates to the field of communication technologies, and in particular, to an out-of-synchronization base station determining method and a server.

BACKGROUND

A time division duplex (TDD)-based communication system requires strict clock synchronization. If clocks of base stations differ greatly, a clock of at least one base station is incorrect, which is referred to as clock out-of-synchronization between base stations. A base station with an incorrect clock is referred to as an out-of-synchronization base station, and a base station with a correct clock is referred to as a synchronization base station. A downlink of the out-of-synchronization base station may interfere with an uplink of the synchronization base station, and a downlink of the synchronization base station may also interfere with an uplink of the out-of-synchronization base station, resulting in severe uplink co-channel interference. Consequently, terminals on a network cannot access the network or services are poor, for example, call drops, handover failures, or service failures may occur. This affects user experience.

Currently, whether clock out-of-synchronization occurs on a base station may be determined depending on whether a clock reference source is lost. Generally, after the clock reference source is lost for a period of time, the base station automatically blocks a sector carrier to prevent the out-of-synchronization base station from interfering with a neighboring base station. However, the loss of the clock reference source does not necessarily cause clock out-of-synchronization, resulting in incorrect determining. In addition, clock out-of-synchronization may be caused by a satellite card fault, a component soft failure, a backplane transmission fault, a software defect, and the like in addition to the loss of the clock reference source. If only the loss of the clock reference source is considered, clock out-of-synchronization caused by other factors may be omitted.

SUMMARY

Embodiments of this application provide an out-of-synchronization base station determining method and a server, to determine an out-of-synchronization base station in a network.

A first aspect of this application provides an out-of-synchronization base station determining method. At least one synchronization domain is determined, where any two neighboring base stations in the synchronization domain are in a relative clock synchronization relationship. Then, a first synchronization domain is determined based on the at least one synchronization domain, where each base station in the first synchronization domain is a synchronization base station. Finally, a second synchronization domain that is in the at least one synchronization domain and that has a relative clock out-of-synchronization relationship with the first synchronization domain is determined, to determine that each base station in the second synchronization domain is an out-of-synchronization base station. Compared with a method for determining an out-of-synchronization base station depending on whether a clock reference source is lost, the out-of-synchronization base station determining method in this application can be used to determine an out-of-synchronization base station in a large range, causing no delay and reducing incorrect determining and omission.

In some feasible implementations, interference events reported by a plurality of base stations are received, to obtain an interference event set. Then, a plurality of to-be-detected base stations and neighboring base stations of the to-be-detected base stations are determined in a plurality of neighboring station connection domains based on the interference event set, where the neighboring station connection domain includes base stations that report interference events and neighboring base stations of the base stations. In addition, a relative clock synchronization relationship and/or a relative clock out-of-synchronization relationship between each of the plurality of to-be-detected base stations and a neighboring base station of the base station are/is detected, to obtain a set of the relative clock synchronization/out-of-synchronization relationships between the plurality of base stations. In this case, the at least one synchronization domain may be determined based on the relative clock synchronization/out-of-synchronization relationship set.

In some feasible implementations, it is determined, based on the relative clock synchronization/out-of-synchronization relationship set, that two base stations that have a relative clock synchronization relationship belong to a same synchronization domain, and it is determined, based on the relative clock synchronization/out-of-synchronization relationship set, that two base stations that have a relative clock out-of-synchronization relationship belong to different synchronization domains. In this way, the at least one synchronization domain is determined based on the relative clock synchronization/out-of-synchronization relationship set.

In some feasible implementations, if a base station a and a base station b that have a relative clock out-of-synchronization relationship exist in one synchronization domain, and the base station a and the base station b are neighboring base stations, station splitting is performed on the base station a to obtain a physical base station a and a virtual base station a; the virtual base station a is used as a neighboring base station of the physical base station a and a neighboring base station of the base station b; and a relationship between the base station a and the base station b as neighboring base stations is released. This eliminates a relative clock out-of-synchronization relationship in one synchronization domain.

In some feasible implementations, the first synchronization domain in which a proportion of a sum of base station weights in an extended connection domain in which the first synchronization domain is located is greater than a preset proportion is determined based on the at least one synchronization domain, where the sum of base station weights is a sum of weights of all base stations in the synchronization domain, the extended connection domain includes an air interface connection domain and the plurality of neighboring station connection domains, the air interface connection domain includes at least one base station, and any two base stations in the air interface connection domain are capable of directly or indirectly communicating with each other. In this way, the first synchronization domain is determined based on the at least one synchronization domain.

In some feasible implementations, if there is no synchronization domain in which a proportion of a sum of base station weights is greater than the preset proportion in the at least one synchronization domain, a base station on which supplementary detection is performed and a neighboring base station of the base station are determined, and then the at least one synchronization domain is combined and/or extended based on the base station on which supplementary detection is performed and the neighboring base station of the base station on which supplementary detection is performed, so that there is a synchronization domain in which the proportion reaches the preset proportion in the at least one synchronization domain, to determine a synchronization domain including a synchronization base station.

In some feasible implementations, the base station on which supplementary detection is performed is a base station in the first synchronization domain, at least one neighboring base station of the base station on which supplementary detection is performed is in the second synchronization domain, and the at least one synchronization domain includes the first synchronization domain and the second synchronization domain, so that combination of two synchronization domains is implemented.

In some feasible implementations, the base station on which supplementary detection is performed is a neighboring base station of at least one base station in the first synchronization domain, the at least one synchronization domain includes the first synchronization domain, and the base station on which supplementary detection is performed does not belong to any of the at least one synchronization domain, so that one synchronization domain is extended.

In some feasible implementations, an out-of-synchronization connection line in the at least one synchronization domain is determined, and two synchronization domains connected through an out-of-synchronization connection line are in a relative clock out-of-synchronization relationship, a third synchronization domain that has a largest quantity of out-of-synchronization connection lines in the at least one synchronization domain is determined, and a base station in the second synchronization domain is made out of service. This eliminates interference caused by clock out-of-synchronization.

According to a second aspect, this application provides a server. The server is configured to perform the method according to any implementation of the first aspect.

According to a third aspect, this application provides a computer-readable storage medium. The computer-readable storage medium stores instructions, and when the instructions are run on a computer, the computer is enabled to perform the method according to any one of the first aspect or the implementations of the first aspect.

A fourth aspect of this application provides a computer program product. The computer program product includes computer-executable instructions. The computer-executable instructions are stored in a computer-readable storage medium. At least one processor of a device may read the computer-executable instructions from the computer-readable storage medium. When the at least one processor executes the computer-executable instructions, the device is enabled to implement the method according to any one of the first aspect or the possible implementations of the first aspect.

A fifth aspect of this application provides a communication apparatus. The communication apparatus may include at least one processor, a memory, and a communication interface. The at least one processor is coupled to the memory and the communication interface. The memory is configured to store instructions, the at least one processor is configured to execute the instructions, and the communication interface is configured to communicate with another communication apparatus under control of the at least one processor. When the instructions are executed by the at least one processor, the at least one processor is enabled to perform the method according to any one of the first aspect or the possible implementations of the first aspect.

A sixth aspect of this application provides a chip system. The chip system includes a processor, configured to support a server in implementing a function in any one of the first aspect or the possible implementations of the first aspect.

In a possible design, the chip system may further include a memory. The memory is configured to store program instructions and data that are necessary for the chip system. The chip system may include a chip, or may include a chip and another discrete component.

For technical effects brought by any one of the third aspect to the sixth aspect or the possible implementations of the third aspect to the sixth aspect, refer to technical effects brought by the first aspect or the different possible implementations of the first aspect. Details are not described herein again.

BRIEF DESCRIPTION OF DRAWINGS

FIG. 2-1 is a schematic flowchart of an out-of-synchronization base station determining method according to an embodiment of this application;

FIG. 2-2 is a diagram in which a relative clock out-of-synchronization relationship exists in a synchronization domain according to an embodiment of this application;

FIG. 2-3 is a diagram of performing station splitting on a base station in a synchronization domain according to an embodiment of this application;

FIG. 2-4 is a diagram of deleting several base stations that have a largest quantity of out-of-synchronization connection lines according to an embodiment of this application;

FIG. 3 is a diagram of a structure of a server according to an embodiment of this application; and FIG. 4 is a diagram of a structure of a communication apparatus according to an embodiment of this application.

DESCRIPTION OF EMBODIMENTS

The following clearly describes the technical solutions in embodiments of this application with reference to the accompanying drawings in embodiments of this application. It is clear that the described embodiments are merely some but not all of embodiments of this application.

In the specification, claims, and accompanying drawings of this application, the terms "first", "second", "third", "fourth", and the like (if existent) are intended to distinguish between similar objects but do not necessarily indicate a specific order or sequence. It should be understood that the data used in such a way are interchangeable in appropriate circumstances, so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

The technical solutions in embodiments of this application may be applied to various communication systems for data processing. The technical solutions provided in this application may be applied to various communication systems, for example, a long term evolution (LTE) system, a 5th generation (5G) communication system, and another similar communication system. In addition, the communication system is further applicable to a future-oriented communication technology, and is applicable to the technical solutions provided in embodiments of this application. A system architecture and a service scenario described in embodiments of this application are intended to describe the technical solutions in embodiments of this application more clearly, and do not constitute a limitation on the technical solutions provided in embodiments of this application. A person skilled in the art may know that: With the evolution of a network architecture and the emergence of new service scenarios, the technical solutions provided in embodiments of this application are also applicable to similar technical problems.

Figure 1:
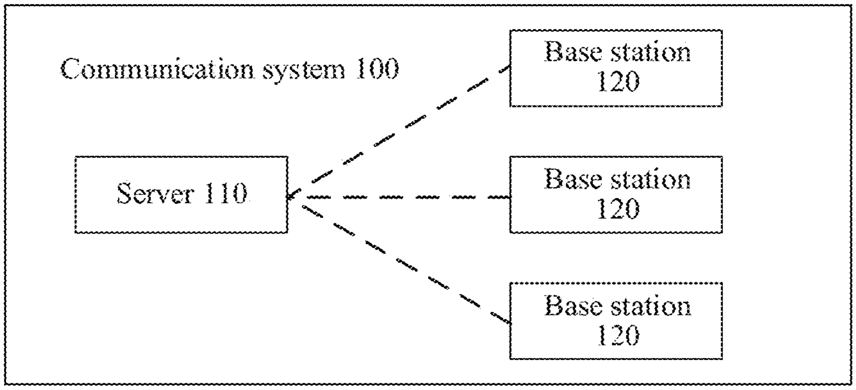
FIG. 1 is a diagram of a composition structure of a communication system according to an embodiment of this application.

FIG. 1 shows a communication system 100 to which this application is applied. The communication system 100 may include a server 110 and a plurality of base stations 120.

In some feasible implementations, the server 110 may be a centralized control determining network element, for example, a logical network element, or may be an entity network element. This is not limited herein. In some feasible implementations, the server 110 may alternatively be integrated into a network management device or a base station, or may be a network management device. This is not limited herein.

For example, the server 110 is a network management device, or may be a server cluster including a plurality of physical servers or a distributed system, or may be a cloud server that provides basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform. This is not limited herein.

The plurality of base stations 120 in embodiments of this application are access devices that a terminal accesses in the mobile communication system in a wireless manner, for example, an evolved NodeB (eNB), a transmission reception point (TRP), a next generation NodeB (gNB) in a 5G mobile communication system, a base station in a future mobile communication system, or an access node in a Wi-Fi system. A specific technology and a specific device form that are used by the network device are not limited in embodiments of this application.

A time division duplex (TDD)-based communication system requires strict clock synchronization. If clocks of base stations differ greatly, at least one base station has an incorrect clock, which is referred to as clock out-of-synchronization between base stations. A base station with an incorrect clock indicates an out-of-synchronization base station, and a base station with a correct clock indicates a synchronization base station. A downlink of an out-of-synchronization base station may interfere with an uplink of a synchronization base station, and a downlink of a synchronization base station may also interfere with an uplink of an out-of-synchronization base station, resulting in severe uplink co-channel interference, an inability of terminals on a network to access the network or a poor service, for example, easy to cause call drops, a handover failure, or an inability to do business. This affects user experience.

Currently, whether clock out-of-synchronization occurs on a base station may be determined depending on whether a clock reference source is lost. Generally, after the clock reference source is lost for a time period, the base station automatically blocks a sector carrier to prevent the out-of-synchronization base station from interfering with a neighboring base station. However, the loss of the clock reference source does not necessarily cause clock out-of-synchronization, resulting in incorrect determining. In addition, clock out-of-synchronization may be caused by the following reasons: the loss of the clock reference source, a satellite card fault, a component soft failure, a backplane transmission fault, a software defect, and the like. If only the loss of the clock reference source is considered, the clock out-of-synchronization caused by other reasons will be omitted. In addition, the base station blocks the sector carrier only after the clock reference source is lost for a specific time period, resulting in a specific delay and affecting user experience.

Currently, network communication quality of each cell of all base stations throughout the network may be detected to obtain network measurement data, where the network measurement data may include interference and noise (IN) information or power information. A cell in which an exception exists in the IN information or the power information is used as a first cell, and the first cell is classified based on different types of exceptions of the IN information or the power information, so as to determine an out-of-synchronization base station. According to the method, out-of-synchronization of a base station can be detected in time, so as to take measures to avoid impact of the out-of-synchronization of the base station on the network communication quality. However, interference in a network is complex. In addition to the exceptions of the IN information or the power information caused by clock out-of-synchronization, an atmospheric duct, heavy traffic, a pseudo base station, and the like may all cause the exception of the IN information or the power information. Determining clock out-of-synchronization only based on the exception of the IN information or the power information results in a high probability of incorrect determining.

Currently, a base station may broadcast or receive a synchronization feature sequence at a specified location in a broadcast frame. All base stations that can normally receive or send a synchronization feature sequence are considered as synchronization base stations. Otherwise, whether a base station is an out-of-synchronization base station needs to be further determined based on an interference change. However, this cannot resolve a problem of a scenario in which a plurality of base stations are in clock out-of-synchronization. For example, if a plurality of base stations are in clock out-of-synchronization at the same time, and synchronization is implemented between the out-of-synchronization base stations, a sequence may also be detected between the out-of-synchronization base stations, and the solution is invalid.

Therefore, in this application, an out-of-synchronization base station determining method is provided. At least one synchronization domain is determined, where any two neighboring base stations in the synchronization domain are in a relative clock synchronization relationship. Then, a first synchronization domain is determined based on the at least one synchronization domain, where each base station in the first synchronization domain is a synchronization base station. Finally, a second synchronization domain that is in the at least one synchronization domain and that has a relative clock out-of-synchronization relationship with the first synchronization domain is determined. In this way, each base station in the second synchronization domain is determined to be an out-of-synchronization base station. Compared with a method for determining an out-of-synchronization base station depending on whether a clock reference source is lost, the out-of-synchronization base station determining method in this application can determine an out-of-synchronization base station in a large range without causing a delay and reducing incorrect determining and omission.

Figures 1, 2:
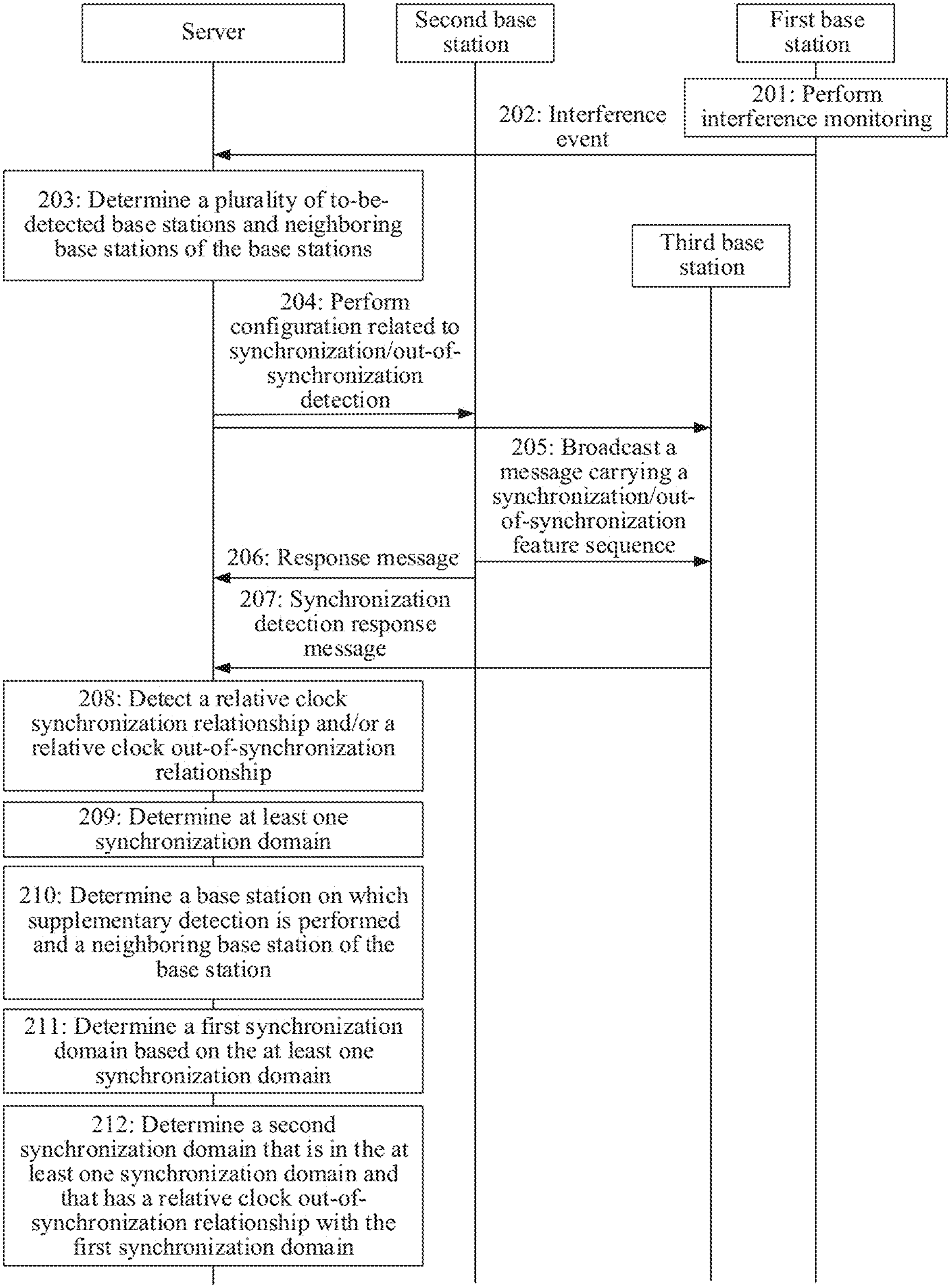
Figure 2:
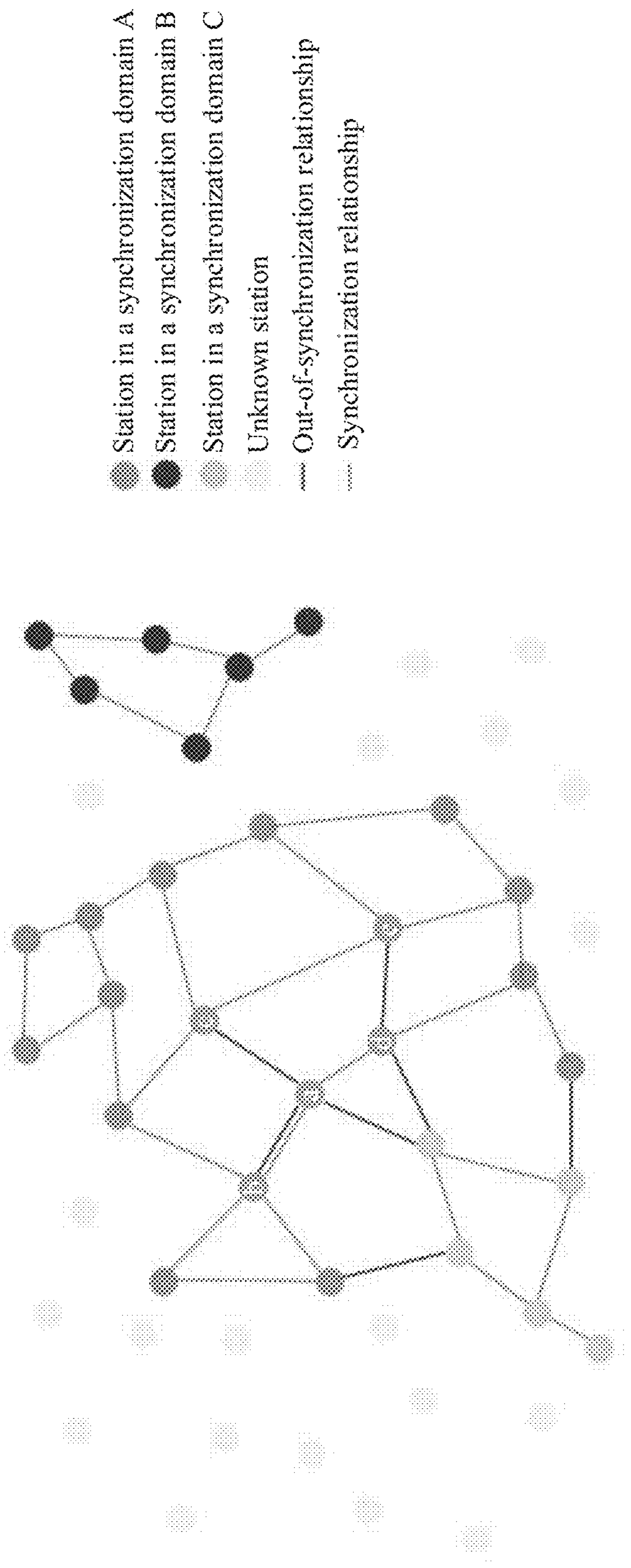

For example, refer to FIG. 2-1. This application provides Embodiment 1 of an out-of-synchronization base station determining method, including the following steps.

201: A first base station performs interference monitoring on each cell of the first base station, to determine a cell having an interference feature of clock out-of-synchronization.

In embodiments of this application, the first base station is one of a plurality of base stations in a communication system. In embodiments of this application, the first base station may perform interference monitoring on each cell of the first base station, to obtain interference data of each cell of the first base station. Then, the first base station determines, based on the interference data of each cell of the first base station, whether each cell has an interference feature compliant with clock out-of-synchronization. In embodiments of this application, when it is determined that the first base station has an abnormal interference cell having the interference feature compliant with clock out-of-synchronization, the first base station is triggered to perform the following step 202. It should be noted that the first base station indicates any base station in the communication system.

It should be noted that, if clock out-of-synchronization occurs on the first base station, last several symbols of a last uplink subframe of the first base station are interfered (which may be interference from a synchronization base station, or may be interference from an out-of-synchronization base station). Therefore, if last several symbols of a last uplink subframe of a cell of the first base station are interfered, it may be determined that the first base station is in clock out-of-synchronization. Therefore, in some feasible implementations, interference data of the cell is an average interference power of the last several symbols in the last uplink subframe of the cell. In some possible implementations, if the average interference power of the last several symbols of the uplink subframe of the interference abnormal cell is higher than a threshold, it may be considered that the interference abnormal cell has an interference feature of clock out-of-synchronization, that is, the interference abnormal cell is a cell having the interference feature of clock out-of-synchronization.

For example, if an average interference power of last four symbols in the last uplink subframe of the interference abnormal cell of the first base station is greater than the threshold, it is determined that the interference abnormal cell has the interference feature of clock out-of-synchronization. In some feasible implementations, the first base station may periodically perform interference monitoring on each cell of the first base station, for example, with a period of 1 second or 10 seconds. This is not limited herein.

For example, the first base station may calculate, in each period, an average interference power of last four symbols of a last uplink subframe of each cell. If the average interference power is greater than or equal to the threshold, and a factor of heavy traffic is excluded, the first base station may determine that the cell has the interference feature of clock out-of-synchronization. For example, the first base station has three cells: a cell 1, a cell 2, and a cell 3, and average interference powers of last several symbols of last uplink subframes of the cell 1, the cell 2, and the cell 3 are respectively equal to 6, 8, and 10. It is assumed that the threshold is 8, because 638, 8=8, and 10>8, and the factor of heavy traffic is excluded, the first base station determines that the cell 2 and the cell 3 corresponding to the average powers equal to 8 and 10 have the interference feature of clock out-of-synchronization.

In embodiments of this application, the first base station performs interference monitoring on all cells of the first base station in the foregoing manner, so that interference caused by clock out-of-synchronization can be found in real time, and a clock out-of-synchronization detection procedure caused by interference generated due to another reason is avoided, to avoid incorrect determining.

202: A plurality of base stations report interference events to a server to obtain an interference event set.

In embodiments of this application, after the first base station performs interference monitoring on each cell of the first base station, and determines an interference abnormal cell, the first base station may summarize the interference abnormal cell and interference data of the interference abnormal cell into interference data of the first base station, and report an interference event to the server, where the interference event indicates that the interference abnormal cell and the interference data of the interference abnormal cell exist in the first base station. In some feasible implementations, the first base station may further obtain interference data generated by an atmospheric duct, a heavy service load, and the like. When the first base station sends the interference data of the first base station to the server, interference generated by the atmospheric duct and the heavy service load may be filtered out. This is not limited herein.

203: The server determines a plurality of to-be-detected base stations and neighboring base stations of the base stations in a plurality of neighboring station connection domains based on the interference event set, where the neighboring station connection domain includes base stations that report interference events and neighboring base stations of the base stations.

It should be noted that, if relative clock out-of-synchronization occurs on the first base station and a neighboring base station of the first base station, interference is caused to a cell of the first base station and a cell of the neighboring base station of the first base station. Therefore, in embodiments of this application, after the server receives the interference events reported by the plurality of base stations, the interference events are aggregated into the interference event set. A plurality of neighboring station connection domains are obtained by using the first base station that reports the interference event and the neighboring base station of the first base station as one neighboring station connection domain, and the plurality of to-be-detected base stations and the neighboring base stations of the to-be-detected base stations are determined from the plurality of neighboring station connection domains. In embodiments of this application, a second base station is one of the plurality of to-be-detected base stations, and a third base station is a neighboring base station of the second base station.

In some feasible implementations, the server may rank a plurality of interfered cells indicated by the interference event set in descending order of reported average interference powers, select first several cells with maximum average interference powers, and use base stations corresponding to the cells as the plurality of to-be-detected base stations. For example, if a base station 1, a base station 2, a base station 3, and a base station 4 report average interference powers of cells of the base station 1, the base station 2, the base station 3, and the base station 4, which are respectively equal to 6, 7, 8, and 9, the server may determine base stations corresponding to a cell whose average interference power is 8 and a cell 4 whose average interference power is 9 as the plurality of to-be-detected base stations.

In embodiments of this application, that two base stations are referred to as neighboring base stations indicates that a cell in one of the base stations is a neighboring cell of a cell in the other base station. It should be noted that if a terminal device may be handed over from one cell to another cell, the two cells are neighboring cells to each other. In some feasible implementations, there may be one or more neighboring base stations of the second base station. This is not limited herein. In embodiments of this application, the third base station indicates one of the neighboring base stations of the second base station. It should be noted that the second base station may be a to-be-detected base station and a neighboring base station of another to-be-detected base station at the same time. For example, the base station 3 and the base station 4 are neighboring base stations, and both the base station 3 and the base station 4 are to-be-detected base stations.

204: The server performs configuration related to synchronization/out-of-synchronization detection on the plurality of to-be-detected base stations and the neighboring base stations of the to-be-detected base stations.

In embodiments of this application, an example in which the second base station is a to-be-detected base station and the third base station is a neighboring base station of the second base station is used for description. For example, that the server performs configuration related to synchronization/out-of-synchronization detection on the second base station and the third base station includes that the server performs configuration related to synchronization detection on the second base station and the third base station, and/or that the server performs configuration related to out-of-synchronization detection on the second base station and the third base station. That the server performs configuration related to synchronization detection on the second base station and the third base station and that the server performs configuration related to out-of-synchronization detection on the second base station and the third base station may be two separate procedures, or may be performed simultaneously. This is not limited herein.

In some feasible implementations, that the server performs configuration related to synchronization/out-of-synchronization detection on the second base station may be that the server indicates, to the second base station, to broadcast, within an agreed time period, a message carrying a synchronization/out-of-synchronization feature sequence, and indicates, to the third base station at the same time, to receive, within the agreed time period, the message carrying the synchronization/out-of-synchronization feature sequence. The server indicates, to the second base station, to broadcast, in an agreed first time period, the message carrying the synchronization feature sequence, and indicates, to the third base station at the same time, to receive, in the agreed first time period, the message carrying the synchronization feature sequence. The server indicates, to the second base station, to broadcast, in an agreed second time period, the message that carrying the synchronization feature sequence, and indicates, to the third base station at the same time, to receive, in the agreed second time period, the message carrying the synchronization feature sequence.

It should be noted that, a TDD-based communication system has a strict requirement on clock synchronization, and the first time period indicated by the server may be a guard period (GP) time period between a downlink and an uplink of one subframe of the second base station. If the third base station and the second base station are in a relative clock synchronization relationship, and there is no wireless base station isolation, the third base station may normally receive the message carrying the synchronization feature sequence. It can be learned that, the message that is broadcast in the first time period and that carries the synchronization feature sequence can only be used to measure whether the second base station and the third base station are in a relative clock synchronization relationship, and cannot measure whether the second base station and the third base station are in clock out-of-synchronization. For example, the third base station and the second base station are in the relative clock synchronization relationship. However, because there is wireless base station isolation, the third base station cannot receive the synchronization feature sequence sent by the second base station. Based on this, it cannot be considered that the third base station and the second base station are in a relative clock out-of-synchronization relationship.

It should be noted that, the TDD-based communication system has a strict requirement on clock synchronization, and the second time period indicated by the server may be a downlink time period of one subframe of the second base station. If the third base station and the second base station are in the relative clock synchronization relationship, the third base station cannot normally receive the message carrying the synchronization feature sequence. If the third base station normally receives the message carrying the synchronization feature sequence, it indicates that the third base station is in an uplink time period, that is, the third base station and the second base station are in the relative clock out-of-synchronization relationship. It can be learned that, the message that is broadcast in the second time period and that carries the out-of-synchronization feature sequence is used to measure whether the second base station and the third base station are in the relative clock out-of-synchronization relationship, and cannot measure whether the second base station and the third base station are in the relative clock synchronization relationship. For example, the third base station and the second base station are in the relative clock out-of-synchronization relationship. However, because there is wireless base station isolation, the third base station cannot receive the out-of-synchronization feature sequence sent by the second base station. Based on this, it cannot be considered that the third base station and the second base station are in the relative clock synchronization relationship.

In some feasible implementations, if both the second base station and the third base station have built-in synchronization/out-of-synchronization feature sequences, the server may send a used synchronization/out-of-synchronization feature sequence to the second base station and the third base station when performing configuration related to synchronization/out-of-synchronization detection on the second base station and the third base station.

In some feasible implementations, one synchronization feature sequence and one out-of-synchronization feature sequence may alternatively be pre-built in the second base station. In this case, the server may not need to indicate a used synchronization/out-of-synchronization feature sequence to the second base station and the third base station when performing configuration related to synchronization/out-of-synchronization detection on the second base station and the third base station.

In some feasible implementations, a plurality of synchronization feature sequences and a plurality of out-of-synchronization feature sequences may alternatively be pre-built in the second base station. In this case, the server may need to indicate a used synchronization/out-of-synchronization feature sequence to the second base station and the third base station when performing configuration related to synchronization/out-of-synchronization detection on the second base station and the third base station.

In some feasible implementations, one synchronization feature sequence and eight out-of-synchronization feature sequences may alternatively be pre-built in the second base station. In this case, when performing configuration related to synchronization detection on the second base station and the third base station, the server may not need to indicate a used synchronization feature sequence to the second base station and the third base station. When performing configuration related to synchronization detection on the second base station and the third base station, the server may need to indicate a used out-of-synchronization feature sequence.

In embodiments of this application, that the server performs configuration related to synchronization/out-of-synchronization detection on the second base station further includes: After broadcasting, in a target time period, the message carrying the synchronization/out-of-synchronization feature sequence, the second base station feeds back a broadcast success response to the server; and when failing to broadcast, in the target time period, the message carrying the synchronization/out-of-synchronization feature sequence, the second base station feeds back a broadcast failure response to the server.

In embodiments of this application, that the server performs configuration related to synchronization/out-of-synchronization detection on the third base station further includes: After receiving, in the target time period, the message carrying the synchronization/out-of-synchronization feature sequence, the third base station feeds back a receive success response to the server; and when failing to receive, in the target time period, the message carrying the synchronization/out-of-synchronization feature sequence, the third base station feeds back a receive failure response to the server.

205: The second base station broadcasts the message carrying the synchronization/out-of-synchronization feature sequence.

In embodiments of this application, the second base station may broadcast, in the first time period, the message carrying the synchronization feature sequence, and/or the second base station may broadcast, in the second time period, the message carrying the out-of-synchronization feature sequence. It should be noted that the first time period may be a GP time period between an uplink time period and a downlink time period of a subframe of the second base station, and the second time period may be a downlink time period of the second base station.

206: The second base station sends a response message to the server.

In some feasible implementations, after successfully broadcasting the message carrying the synchronization/out-of-synchronization feature sequence, the second base station may send a broadcast success response message to the server. In some feasible implementations, if the second base station fails to broadcast, in an agreed time period, the message carrying the synchronization/out-of-synchronization feature sequence because a cell is not enabled or the second base station misses the agreed time period for broadcasting the message carrying the synchronization/out-of-synchronization feature sequence, the second base station sends a broadcast failure response message to the server.

207: The third base station sends a synchronization detection response message to the server.

In some feasible implementations, after successfully receiving the message carrying the synchronization/out-of-synchronization feature sequence, the third base station may send a receive success response message to the server. In some feasible implementations, if the third base station fails to receive, in the agreed time period, the message carrying the synchronization/out-of-synchronization feature sequence, the third base station sends a receive failure response message to the server.

It should be noted that the third base station is a neighboring base station of the second base station, and the second base station may have a plurality of neighboring base stations. In this case, the server may receive a receive failure response message or a receive success response message fed back by each neighboring base station of the second base station, to determine relative clock synchronization/out-of-synchronization relationships between the second base station and the neighboring base stations of the second base station.

208: The server detects a relative clock synchronization relationship and/or a relative clock out-of-synchronization relationship between each of the plurality of to-be-detected base stations and a neighboring base station of the base station, to obtain a set of the relative clock synchronization/out-of-synchronization relationships between the plurality of base stations.

In some feasible implementations, if the server receives a receive success response message that is sent by the third base station and that is for the message of the synchronization feature sequence, it may be determined that the third base station and the second base station are in the relative clock synchronization relationship, and the third base station and the second base station belong to a same synchronization domain.

In some feasible implementations, if the server receives a receive failure response message that is sent by the third base station and that is for the message of the synchronization feature sequence, it cannot be determined that the third base station and the second base station are in the relative clock synchronization relationship, and it cannot be determined that the third base station and the second base station are in the relative clock out-of-synchronization relationship.

In some feasible implementations, if the server receives a receive success response message that is sent by the third base station and that is for the message of the out-of-synchronization feature sequence, it may be determined that the third base station and the second base station are in the relative clock out-of-synchronization relationship, and the third base station and the second base station do not belong to a same synchronization domain.

In some feasible implementations, if the server receives a receive failure response message that is sent by the third base station and that is for the message of the out-of-synchronization feature sequence, it may not be determined that the third base station and the second base station are in the relative clock out-of-synchronization relationship, and it may not be determined that the third base station and the second base station are in the relative clock out-of-synchronization relationship.

In some feasible implementations, if the server receives a receive failure response message that is sent by the third base station and that is for the message of the out-of-synchronization feature sequence and a receive failure response message that is sent by the third base station and that is for the message of the synchronization feature sequence, it is determined that the third base station and the second base station are in wireless base station isolation and cannot communicate with each other.

In some feasible implementations, if the server receives a receive success response message that is sent by the third base station and that is for the message of the out-of-synchronization feature sequence and a receive success response message that is sent by the third base station and that is for the message of the synchronization feature sequence, it is determined that, for example, some RRUs are out of synchronization in the third base station and the second base station, or a time difference between base stations is within a critical interval, and splitting needs to be performed subsequently. Details are not described herein.

209: The server determines the at least one synchronization domain based on the relative clock synchronization/out-of-synchronization relationship set.

It should be noted that any two base stations that are neighboring base stations and that are in the synchronization domain have a relative clock synchronization relationship. In some feasible implementations, it is determined, based on the relative clock synchronization/out-of-synchronization relationship set, that two base stations that have a relative clock synchronization relationship belong to a same synchronization domain; and it is determined, based on the relative clock synchronization/out-of-synchronization relationship set, that two base stations that have a relative clock out-of-synchronization relationship belong to different synchronization domains.

For example, there are five base stations: a base station 1, a base station 2, a base station 3, a base station 4, and a base station 5. The base station 1 and the base station 2 are in a clock synchronization relationship and belong to a synchronization domain 1. The base station 3, the base station 4, and the base station 5 are in a clock synchronization relationship and belong to a synchronization domain 2.

It should be noted that the relative clock synchronization relationship is transitive. For example, when the clock synchronization relationship between the base station 3 and the base station 5 is not detected, because the base station 3 and the base station 4 are in a relative clock synchronization relationship, and the base station 4 and the base station 5 are in a relative clock synchronization relationship, it may be considered that the base station 3 and the base station 5 are in a relative clock synchronization relationship.

For example, if any one of base stations in the synchronization domain 1 and any one of base stations in the synchronization domain 2 are in a relative clock synchronization relationship, any base station in the synchronization domain 1 and any base station in the synchronization domain 2 are in a relative clock synchronization relationship. In this case, the synchronization domain 1 and the synchronization domain 2 may be combined into one synchronization domain. For example, the synchronization domain 1 includes the base station 1 and the base station 2, and the synchronization domain 2 includes the base station 3, the base station 4, and the base station 5. If the base station 1 and the base station 3 are in a relative clock synchronization relationship, the synchronization domain 1 and the synchronization domain 2 may be combined into one synchronization domain.

In embodiments of this application, after determining the relative clock synchronization/out-of-synchronization relationship between each to-be-detected base station and a neighboring base station of the to-be-detected base station, the server may determine at least one air interface connection domain based on the relative clock synchronization/out-of-synchronization relationship between the base stations. It should be noted that two base stations in the air interface connection domain may directly or indirectly communicate with each other. For example, for the second base station and the third base station, if the third base station may receive the message that carries the synchronization/out-of-synchronization feature sequence and that is sent by the second base station, the second base station and the third base station belong to a same air interface connection domain. It should be noted that it is determined that a same air interface connection domain is transitive. For example, when a clock synchronization/out-of-synchronization relationship between the base station 3 and the base station 5 is not detected, or when the base station 3 and the base station 5 cannot directly communicate with each other (that is, the third base station cannot receive the message that carries the synchronization/out-of-synchronization feature sequence and that is sent by the second base station, or the second base station cannot receive the message that carries the synchronization/out-of-synchronization feature sequence and that is sent by the third base station), because the base station 3 and the base station 4 belong to a same air interface connection domain, and the base station 4 and the base station 5 belong to a same air interface connection domain, it may be considered that the base station 3 and the base station 5 belong to the same air interface connection domain. Further, if any one of base stations in an air interface connection domain 1 may implement direct or indirect communication with any one of base stations in an air interface connection domain 2, the air interface connection domain 1 and the air interface connection domain 2 may be combined into one air interface connection domain.

In embodiments of this application, a base station control determining network element may consider a plurality of base stations having a relative clock synchronization relationship as one synchronization domain. For example, there are a base station 1, a base station 2, a base station 3, a base station 4, and a base station 5. The base station 1 and the base station 2 are in a relative clock synchronization relationship, and the base station 3, the base station 4, and the base station 5 are in a relative clock synchronization relationship. In this case, the base station 1 and the base station 2 belong to a same synchronization domain (which is set to be a synchronization domain 1), and the base station 3, the base station 4, and the base station 5 belong to a same synchronization domain (which is set to be a synchronization domain 2). If the base station 1 and the base station 3 are in a relative clock out-of-synchronization relationship, any base station in the synchronization domain 1 and any base station in the synchronization domain 2 are in the relative clock out-of-synchronization relationship.

In some feasible implementations, if any base station in the synchronization domain 1 and any base station in the synchronization domain 2 are in a relative clock synchronization relationship, the synchronization domain 1 and the synchronization domain 2 may be combined into a same synchronization domain. In some feasible implementations, if the base station 1 belongs to the synchronization domain 1, the base station 3 belongs to the synchronization domain 2, the base station 1 is a neighboring base station of the base station 3, and the base station 1 and the base station 3 are in a relative clock synchronization relationship, the synchronization domain 1 and the synchronization domain 2 may be combined. If the base station 1 is not a neighboring base station of the base station 3, there is a base station 6 that is a neighboring base station of the base station 1 and that is also a neighboring base station of the base station 3, the base station 6 and the base station 1 are in a relative clock synchronization relationship, and the base station 6 and the base station 3 are also in a relative clock synchronization relationship, it may also be determined that the base station 1 and the base station 3 are also in the relative clock synchronization relationship, and the synchronization domain 1 and the synchronization domain 2 may also be combined. In addition, the base station 6 belongs to the synchronization domain 1, the synchronization domain 2, and a combined synchronization domain.

In embodiments of this application, after the server determines the at least one synchronization domain, if a quantity of synchronization domains is 1, it is determined that all base stations in the synchronization domain are synchronization base stations, and there is no out-of-synchronization base station. If the quantity of synchronization domains is greater than 1, the server may determine a relative clock out-of-synchronization relationship between the synchronization domains based on a relative clock out-of-synchronization relationship between base stations, so that a relative clock out-of-synchronization relationship is determined between two neighboring synchronization domains.

For example, if any one of base stations in the synchronization domain 1 and any one of base stations in the synchronization domain 2 are in a relative clock out-of-synchronization relationship, any base station in the synchronization domain 1 and any base station in the synchronization domain 2 are in a relative clock out-of-synchronization relationship. In this case, the synchronization domain 1 and the synchronization domain 2 are in a relative clock out-of-synchronization relationship. For example, the synchronization domain 1 includes the base station 1 and the base station 2, and the synchronization domain 2 includes the base station 3, the base station 4, and the base station 5. If the base station 1 and the base station 3 are in a relative clock out-of-synchronization relationship, the synchronization domain 1 and the synchronization domain 2 are in a relative clock out-of-synchronization relationship.

It should be noted that whether two synchronization domains are in a relative clock out-of-synchronization relationship can be determined only when the two synchronization domains belong to a same air interface connection domain. If the two synchronization domains do not belong to one air interface connection domain, it cannot be measured whether a base station in one synchronization domain and a base station in the other synchronization domain are in a relative clock out-of-synchronization relationship, that is, it cannot be detected whether the two synchronization domains are in a relative clock out-of-synchronization relationship. Therefore, there may be situations in which it is impossible to measure whether the two synchronization domains are in a relative clock out-of-synchronization relationship. If the two synchronization domains are neither in a relative clock synchronization relationship nor in a relative clock out-of-synchronization relationship, the two synchronization domains are in a case in which a relative clock synchronization/out-of-synchronization relationship is not detected. It should be noted that the air interface connection domain includes one or more base stations. If the air interface connection domain includes two or more base stations, two base stations belonging to a same air interface connection domain may directly or indirectly communicate with each other. For example, the base station 1 and the base station 2 may directly communicate with each other, and the base station 2 and the base station 3 may directly communicate with each other, that is, the base station 1 and the base station 3 may indirectly communicate with each other, and the base station 1 and the base station 3 belong to a same air interface connection domain.

210: If there is no synchronization domain in which a proportion of a sum of base station weights is greater than a preset proportion in the at least one synchronization domain, the server determines a base station on which supplementary detection is performed and a neighboring base station of the base station.

In embodiments of this application, the supplementary detection includes synchronization sequence supplementary detection and out-of-synchronization sequence supplementary detection. The following separately provides descriptions.

1. Synchronization Sequence Supplementary Detection.

It should be noted that a purpose of performing synchronization sequence supplementary detection is to extend one or more synchronization domains until one synchronization domain meets a requirement of the preset proportion.

In embodiments of this application, there are two scenarios in which a synchronization domain is extended: 1. If it is determined that neighboring synchronization domains are in a relative clock out-of-synchronization relationship, the synchronization domains needs to be extended outward. 2. If it is not determined that neighboring synchronization domains are in a relative clock out-of-synchronization relationship, combination needs to be tried. In embodiments of this application, after an air interface connection domain and extended connection domains are determined, each extended connection domain is sequentially processed. In some feasible implementations, processing may start from an extended connection domain with a largest quantity of base stations.

For example, it is assumed that there are four synchronization domains in an extended connection domain: A, B, C, and D. The server performs the following steps on the four synchronization domains.

1. Select a Fourth Base Station on which Supplementary Detection is Performed to Combine Synchronization Domains.

Any two synchronization domains (a synchronization domain 1 and a synchronization domain 2) in A, B, C, and D are traversed, base stations in the synchronization domain 1 are traversed, and one base station having a largest quantity of neighboring base stations in the synchronization domain 2 is selected as the fourth base station on which supplementary detection is performed. It should be noted that if it is determined that the synchronization domain 1 and the synchronization domain 2 are in a relative clock out-of-synchronization relationship, or any one of base stations in the synchronization domain 1 and any one of base stations in the synchronization domain 2 are neighboring base stations, the synchronization domain 1 and the synchronization domain 2 are skipped, and two synchronization domains are reselected.

2. Select a Fourth Base Station on which Supplementary Detection is Performed to Extend a Synchronization Domain.

Any one (a synchronization domain 1) of synchronization domains A, B, C, and D is traversed, neighboring stations (which are neighboring base stations of one base station in the synchronization domain 1, but are not base stations in the synchronization domain 1) outside the synchronization domain 1 are traversed, and one base station having a neighboring base station in the synchronization domain 1 is selected as the fourth base station on which supplementary detection is performed.

2. Out-of-Synchronization Sequence Supplementary Detection.

It should be noted that a purpose of performing out-of-synchronization sequence supplementary detection is to determine an out-of-synchronization relationship between synchronization domains. If it is determined that all neighboring synchronization domains are in a relative clock out-of-synchronization relationship, out-of-synchronization sequence supplementary detection does not need to be performed.

In embodiments of this application, after an air interface connection domain and extended connection domains are determined, each extended connection domain is sequentially processed. In some feasible implementations, processing may start from an extended connection domain with a largest quantity of base stations. For example, it is assumed that there are four synchronization domains in an extended connection domain: A, B, C, and D. The server performs the following steps on the four synchronization domains.

1. Select a Fourth Base Station on which Supplementary Detection is Performed to Combine Synchronization Domains.

In some feasible implementations, the base station on which supplementary detection is performed is a base station in a first synchronization domain, at least one neighboring base station of the base station on which supplementary detection is performed is in a second synchronization domain, and the at least one synchronization domain includes the first synchronization domain and the second synchronization domain.

For example, any two synchronization domains (a synchronization domain 1 and a synchronization domain 2) of A, B, C, and D are traversed. If it is not determined that the synchronization domain 1 and the synchronization domain 2 are in a relative clock out-of-synchronization relationship, base stations in the synchronization domain 1 are traversed, and one base station having a largest quantity of neighboring base stations in the synchronization domain 2 is selected as the fourth base station on which supplementary detection is performed. If quantities of neighboring base stations are equal, a base station with strongest interference is further selected. It should be noted that if it is determined that the synchronization domain 1 and the synchronization domain 2 are in a relative clock out-of-synchronization relationship, or any one of base stations in the synchronization domain 1 and any one of base stations in the synchronization domain 2 are neighboring base stations, the synchronization domain 1 and the synchronization domain 2 are skipped, and two synchronization domains are reselected.

2. Select a Fourth Base Station on which Supplementary Detection is Performed to Extend a Synchronization Domain.

In some feasible implementations, the base station on which supplementary detection is performed is a neighboring base station of at least one base station in the first synchronization domain, the at least one synchronization domain includes the first synchronization domain, and the base station on which supplementary detection is performed does not belong to any of the at least one synchronization domain.

For example, any one (a synchronization domain 1) of synchronization domains A, B, C, and D is traversed, neighboring stations (which are neighboring base stations of one base station in the synchronization domain 1, but are not base stations in the synchronization domain 1) outside the synchronization domain 1 are traversed, and one base station having a neighboring base station in the synchronization domain 1 is selected as the fourth base station on which supplementary detection is performed.

In embodiments of this application, all extended connection domains are sequentially processed until a quantity of selected base stations is greater than or equal to a preset value (for example, 180) and no base station can be selected.

For example, after the fourth base station on which supplementary detection is performed is determined, a fifth base station may be determined based on the neighboring base station of the fourth base station. It should be noted that the fourth base station may have a plurality of neighboring base stations, and the fifth base station is used as a reference herein. Then, the server performs configuration related to synchronization/out-of-synchronization detection on the fourth base station and the fifth base station (specifically, refer to step 204, and details are not described herein). The fourth base station broadcasts a message carrying a synchronization/out-of-synchronization feature sequence (specifically, refer to step 205, and details are not described herein). The fourth base station sends a response message to the server (specifically, refer to step 206, and details are not described herein). The fifth base station sends synchronization detection response information to the server (specifically, refer to step 207, and details are not described herein). The server determines a relative clock synchronization/out-of-synchronization relationship between the fourth base station and the fifth base station (specifically, refer to step 208, and details are not described herein). The server determines the at least one synchronization domain based on the clock synchronization/out-of-synchronization relationship between the base stations (specifically, refer to step 209, and details are not described herein again).

211: The server determines a first synchronization domain based on the at least one synchronization domain, where each base station in the first synchronization domain is a synchronization base station.

In embodiments of this application, the server may determine, based on the relative clock synchronization/out-of-synchronization relationship set, that two base stations that have a relative clock synchronization relationship belong to a same synchronization domain, and determine, based on the relative clock synchronization/out-of-synchronization relationship set, that two base stations that have a relative clock out-of-synchronization relationship belong to different synchronization domains.

For example, the first synchronization domain in which a proportion of a sum of base station weights in an extended connection domain in which the first synchronization domain is located is greater than a preset proportion is determined based on the at least one synchronization domain. The sum of base station weights is a sum of weights of all base stations in the synchronization domain. The extended connection domain includes an air interface connection domain and the plurality of neighboring station connection domains. The air interface connection domain includes at least one base station. Any two base stations in the air interface connection domain are capable of directly or indirectly communicating with each other.

In some feasible implementations, if there is no synchronization domain in which a proportion of a sum of base station weights is greater than the preset proportion in the at least one synchronization domain, the server determines a base station on which supplementary detection is performed and a neighboring base station of the base station, and then combines and/or extends the at least one synchronization domain based on the base station on which supplementary detection is performed and the neighboring base station of the base station on which supplementary detection is performed.

212: The server determines a second synchronization domain that is in the at least one synchronization domain and that has a relative clock out-of-synchronization relationship with the first synchronization domain, where each base station in the second synchronization domain is an out-of-synchronization base station.

In embodiments of this application, after the server determines the at least one synchronization domain, if a quantity of synchronization domains is 1, it is determined that all base stations in the synchronization domain are synchronization base stations, and there is no out-of-synchronization base station. If the quantity of synchronization domains is greater than 1, and a sum of weights of one synchronization domain is greater than the preset proportion, it is determined that all base stations in the synchronization domain are synchronization base stations, and all base stations in another synchronization domain that has a clock out-of-synchronization relationship with the synchronization domain are out-of-synchronization base stations.

For example, there are two synchronization domains: a synchronization domain 1 and a synchronization domain 2, and the synchronization domain 1 and the synchronization domain 2 are in a clock out-of-synchronization relationship. If the preset proportion is 60%, and a weight of the synchronization domain 1 is greater than 60%, all base stations in the synchronization domain 1 are synchronization base stations, and all base stations in the synchronization domain 2 are in an out-of-synchronization relationship. If wireless base station isolation exists between the synchronization domain 1 and the synchronization domain 2, it is determined that all the base stations in the synchronization domain 1 and all the base stations in the synchronization domain 2 are synchronization base stations. It should be noted that the wireless base station isolation means that any base station in the synchronization domain 1 and any base station in the synchronization domain 2 are not in a same air interface connection domain, that is, the synchronization domain 1 and the synchronization domain 2 do not belong to a same air interface connection domain.

It should be noted that, in a network, different base stations may belong to different extended connection domains. In some feasible implementations, an out-of-synchronization base station in the extended connection domain is separately determined in a unit of the extended connection domain. It should be noted that the extended connection domain includes an air interface connection domain and a plurality of neighboring station connection domains, where the neighboring station connection domains include base stations that report interference events and neighboring base stations of the base stations. For example, the first base station and all neighboring base stations of the first base station form a neighboring station connection domain. In some feasible implementations, the out-of-synchronization base station may be determined according to the following determining algorithm.

Step 1: If a proportion of a quantity of base stations in the synchronization domain 1 in the extended connection domain reaches the preset proportion (for example, 60%, where the preset proportion is configurable), all base stations in the synchronization domain 1 are determined as synchronization base stations.

Step 2: All base stations that have an out-of-synchronization relationship with the synchronization base stations are determined as out-of-synchronization base stations.

Step 3: If the synchronization domain 2 in the extended connection domain includes an out-of-synchronization base station, all base stations in the synchronization domain 2 are out-of-synchronization base stations.

It should be noted that, in the existing network, two base stations may be detected to be in both a relative clock synchronization relationship and a relative clock out-of-synchronization relationship. For example, if clock out-of-synchronization occurs on some remote radio units (RRUs) in a base station, or a time difference of the base station is within a critical interval, the two base stations is detected to be in both the relative clock synchronization relationship and the relative clock out-of-synchronization relationship.

For example, if the proportion of the quantity of base stations in the synchronization domain 1 reaches the preset proportion, it is determined that all the base stations in the synchronization domain 1 are synchronization base stations. It is assumed that the synchronization domain 1 includes 10 base stations: a, b, c, d, e, f, g, h, i, and j, which are all synchronization base stations, but a-b, a-c, and a-d are in a clock out-of-synchronization relationship. Based on step 2, a, b, c, and d should all be determined as out-of-synchronization base stations, or all the base stations in the synchronization domain 1 are out-of-synchronization base stations, which results in generating of a conflict.

In some feasible implementations, if the foregoing conflict exists, that is, the two base stations in the clock out-of-synchronization relationship in the synchronization domain are found, station splitting is first performed on a base station. The following describes station splitting in detail.

For example, if a base station a and a base station b that have a relative clock out-of-synchronization relationship exist in one synchronization domain, and the base station a and the base station b are neighboring base stations, station splitting is performed on the base station a to obtain a physical base station a and a virtual base station a. The virtual base station a is used as a neighboring base station of the physical base station a and a neighboring base station of the base station b. A relationship between the base station a and the base station b as neighboring base stations is released. For example, as shown in FIG. 2-2, in a synchronization domain A, a-b, a-c, and a-d are in a relative clock out-of-synchronization relationship. In this case, a base station may be selected from a, b, c, d, and e for station splitting. There are two out-of-synchronization connection lines for a, two out-of-synchronization connection lines for d, and one out-of-synchronization connection line for each of b, c, and e. In this case, it may be determined that a and d are base stations on which station splitting is performed.

Figures 2, 3:
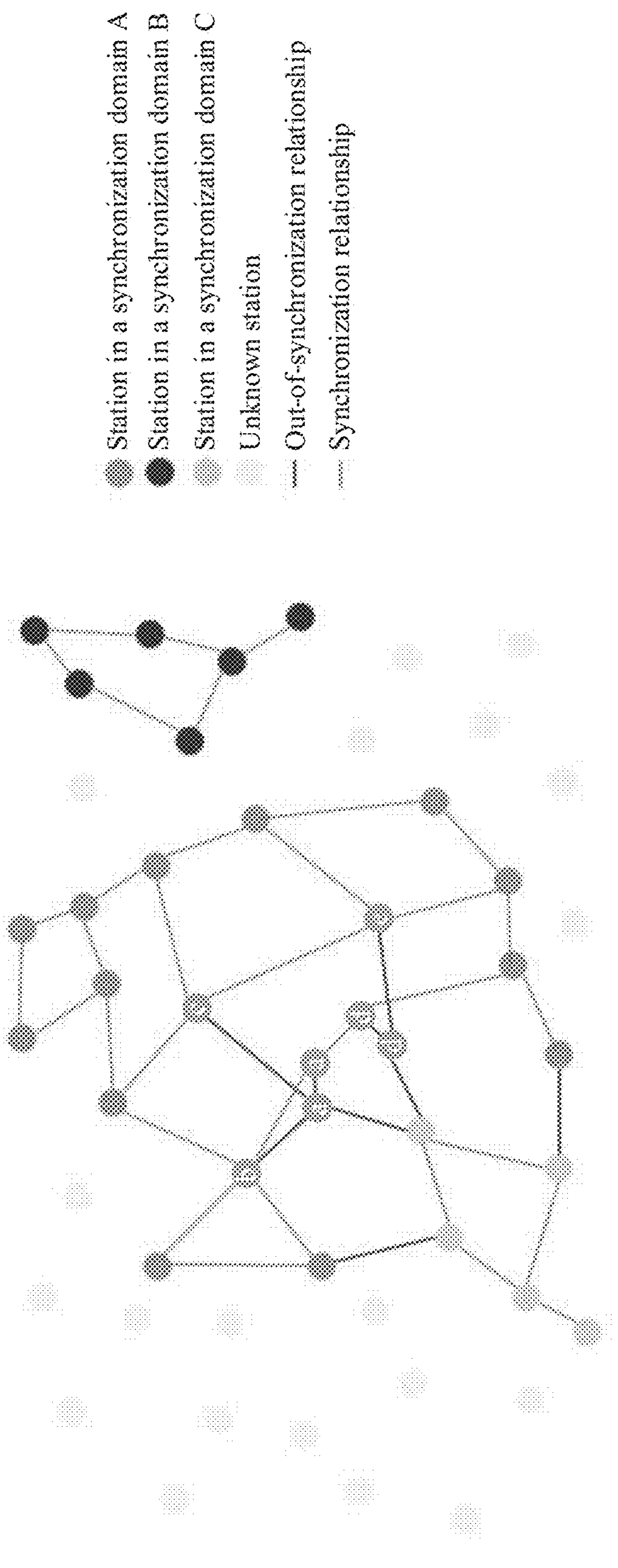

As shown in FIG. 2-3, after station splitting is performed on a and d, a becomes two base stations: a physical base station a and a virtual base station a; and d becomes two base stations: a physical base station d and a virtual base station d. The physical base station a and the virtual base station a are in a clock out-of-synchronization relationship, and the physical base station d and the virtual base station d are in a clock out-of-synchronization relationship. Then, out-of-synchronization connection lines exist between the virtual base station a and the physical base station a, b, and c, and out-of-synchronization connection lines exist between the virtual base station d and a, d, and e. In this case, the virtual base station a and the virtual base station d are excluded from the synchronization domain A, so that a and c do not directly communicate with each other, and d and e do not directly communicate with each other.

Based on station splitting performed on a and d, there is no clock out-of-synchronization relationship in the synchronization domain A. It should be noted that, the virtual base station a is a virtual base station added based on an algorithm requirement. In some feasible implementations, if the virtual base station a is determined as an out-of-synchronization base station, a is displayed as an out-of-synchronization base station on a client plane.

In some feasible implementations, the server may determine an out-of-synchronization connection line in the at least one synchronization domain, determine that two synchronization domains connected through an out-of-synchronization connection line are in a relative clock out-of-synchronization relationship, determine a third synchronization domain that has a largest quantity of out-of-synchronization connection lines in the at least one synchronization domain, and make the base station in the second synchronization domain out of service.

For example, after the foregoing station splitting, one synchronization domain may be considered as one node, and each node has a weight, and is a sum of weights of all base stations in the synchronization domain. An out-of-synchronization connection line may exist in the synchronization domain. It should be noted that a weight of a base station may be determined by the server, or may be reported by the base station to the server. This is not limited herein. For example, two clock sources exist in a base station. If the two clock sources are consistent, the weight of the base station is higher; or if the two clock sources are inconsistent, the weight of the base station is lower.

In embodiments of this application, a minimum node set that needs to be deleted for eliminating an out-of-synchronization connection line in a synchronization domain may be found. If a quantity of base stations in the minimum node set is less than or equal to a preset quantity (for example, 100), and a proportion of a sum of weights of the minimum node set in a sum of weights of all base stations in the extended connection domain is less than a preset proportion (for example, 34%), it is determined that all stations in all synchronization domains in the minimum node set are out-of-synchronization base stations. If the foregoing conditions are not met, all the base stations in all the synchronization domains in the minimum node set are determined as suspicious out-of-synchronization stations, and manual processing is performed.

It should be noted that, for a base station that is determined to perform station splitting, a principle of minimum station loss may be followed, that is, to eliminate all connection lines of an out-of-synchronization relationship, a quantity of to-be-deleted base stations is the smallest. It should be noted that, deleting a base station is equivalent to that the base station is out of service, and all out-of-synchronization connection lines connected to the base station may be eliminated. This is a mathematical problem, that is, how to delete a smallest quantity of base stations to eliminate all out-of-synchronization connection lines.

Figures 2, 3, 4:
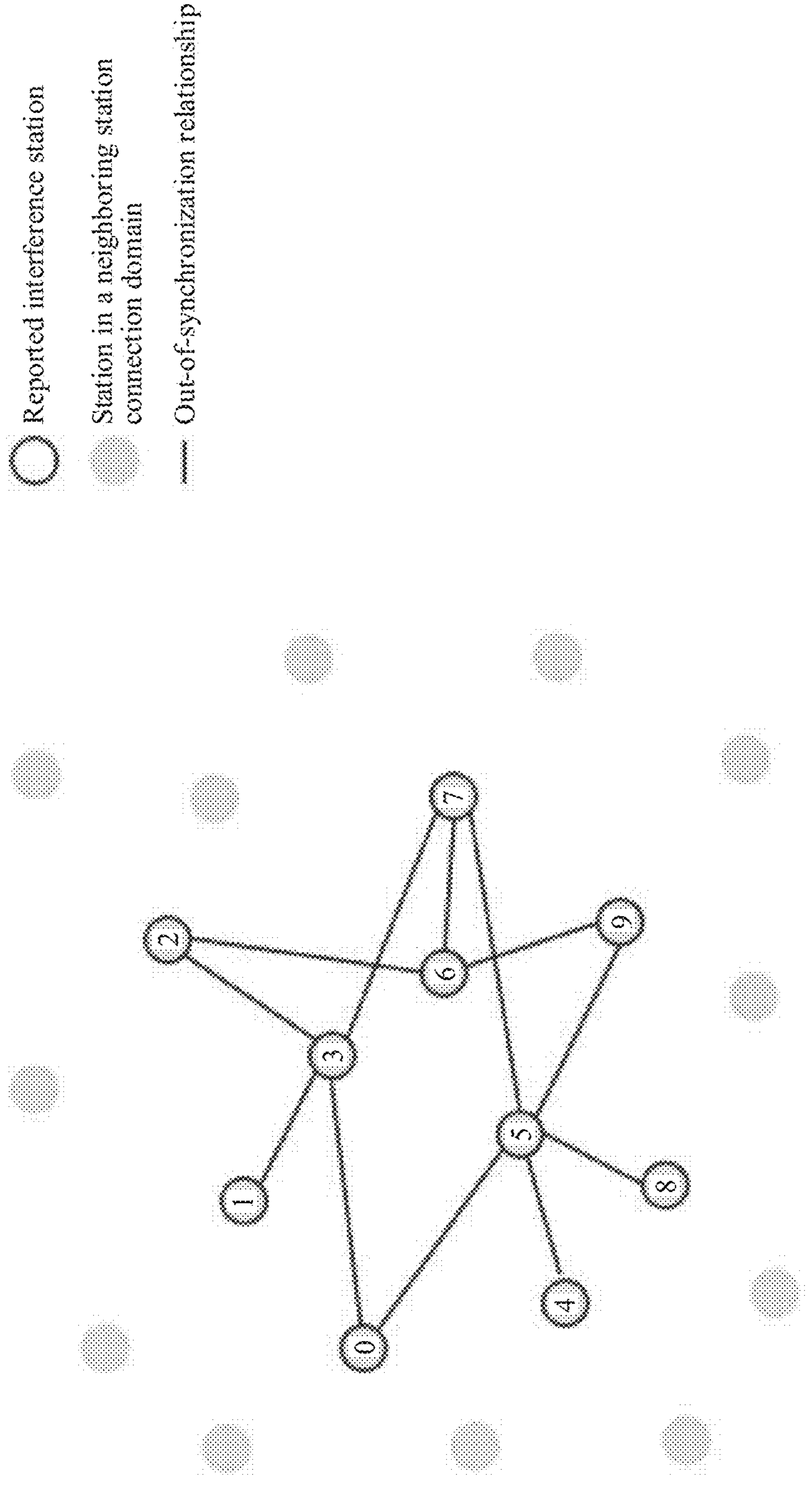
Figure 3:
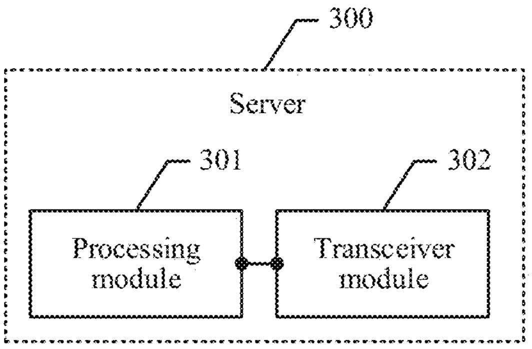
Figure 4:
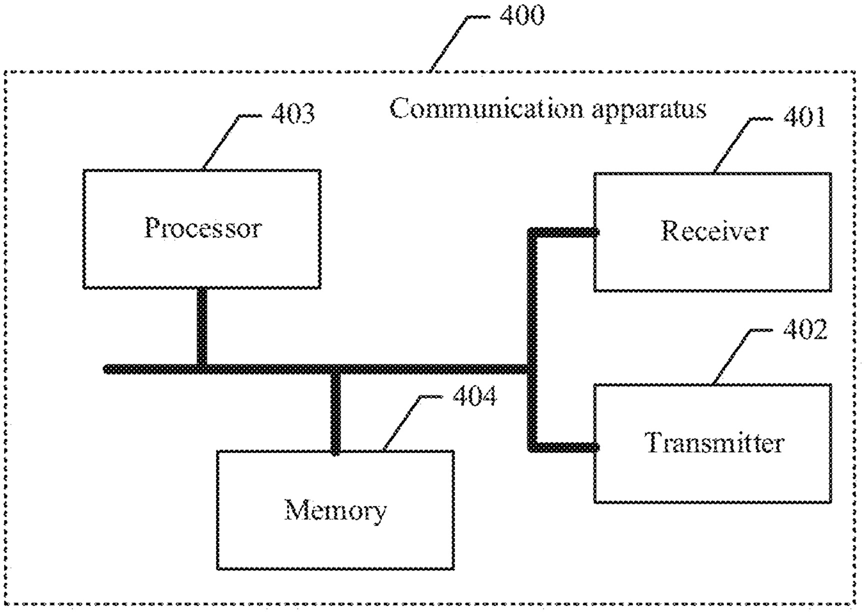

It should be noted that, that two base stations have an out-of-synchronization relationship means that interference exists between the two base stations. If the out-of-synchronization relationship can be eliminated, the interference is eliminated. In some feasible implementations, quantities of out-of-synchronization connection lines between base stations in the synchronization domain may be determined, then the base stations are sorted in descending order of the quantities, and then several base stations that have a largest quantity of out-of-synchronization connection lines are deleted. For example, as shown in FIG. 2-4, base stations 3, 5, 6, and 7 respectively have four, five, three, and three out-of-synchronization connection lines. After base stations 3, 5, and 6 are deleted, all out-of-synchronization connection lines may be eliminated. In some feasible implementations, the foregoing base station may be replaced with a synchronization domain. This is not limited herein.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that embodiments described in this specification all belong to example embodiments, and the involved actions and modules are not necessarily required by this application.

To better implement the solutions of embodiments of this application, a related apparatus for implementing the solutions is further provided below.

Refer to FIG. 3, a server 300 provided in embodiments of this application may include a processing module 301 and a transceiver module 302.

The processing module 301 is configured to determine at least one synchronization domain, where any two neighboring base stations in the synchronization domain are in a relative clock synchronization relationship.

The processing module 301 is further configured to determine a first synchronization domain based on the at least one synchronization domain, where each base station in the first synchronization domain is a synchronization base station.

The processing module 301 is further configured to determine a second synchronization domain that is in the at least one synchronization domain and that has a relative clock out-of-synchronization relationship with the first synchronization domain, where each base station in the second synchronization domain is an out-of-synchronization base station.

In some feasible implementations, the transceiver module 302 is configured to receive interference events reported by a plurality of base stations, to obtain an interference event set.

The processing module 301 is further configured to determine a plurality of to-be-detected base stations and neighboring base stations of the base stations in a plurality of neighboring station connection domains based on the interference event set, where the neighboring station connection domain includes base station that reports interference events and neighboring base stations of the base stations.

The processing module 301 is further configured to detect a relative clock synchronization relationship and/or a relative clock out-of-synchronization relationship between each of the plurality of to-be-detected base stations and a neighboring base station of the base station, to obtain a set of the relative clock synchronization/out-of-synchronization relationships between the plurality of base stations.

The processing module 301 is further configured to determine the at least one synchronization domain based on the relative clock synchronization/out-of-synchronization relationship set.

In some feasible implementations, the processing module 301 is specifically configured to: determine, based on the relative clock synchronization/out-of-synchronization relationship set, that two base stations that have a relative clock synchronization relationship belong to a same synchronization domain; and determine, based on the relative clock synchronization/out-of-synchronization relationship set, that two base stations that have a relative clock out-of-synchronization relationship belong to different synchronization domains.

In some feasible implementations, the processing module 301 is further configured to: if a base station a and a base station b that have a relative clock out-of-synchronization relationship exist in one synchronization domain, and the base station a and the base station b are neighboring base stations, perform station splitting on the base station a to obtain a physical base station a and a virtual base station a; use the virtual base station a as a neighboring base station of the physical base station a and a neighboring base station of the base station b; and release a relationship between the base station a and the base station b as neighboring base stations.

In some feasible implementations, the processing module 301 is specifically configured to: determine, based on the at least one synchronization domain, the first synchronization domain in which a proportion of a sum of base station weights in an extended connection domain in which the first synchronization domain is located is greater than a preset proportion, where the sum of base station weights is a sum of weights of all base stations in the synchronization domain, the extended connection domain includes an air interface connection domain and the plurality of neighboring station connection domains, the air interface connection domain includes at least one base station, and any two base stations in the air interface connection domain are capable of directly or indirectly communicating with each other.

In some feasible implementations, the processing module 301 is further configured to: if there is no synchronization domain in which a proportion of a sum of base station weights is greater than the preset proportion in the at least one synchronization domain, determine a base station on which supplementary detection is performed and a neighboring base station of the base station; and combine and/or extend the at least one synchronization domain based on the base station on which supplementary detection is performed and the neighboring base station of the base station on which supplementary detection is performed.

In some feasible implementations, the base station on which supplementary detection is performed is a base station in the first synchronization domain, at least one neighboring base station of the base station on which supplementary detection is performed is in the second synchronization domain, and the at least one synchronization domain includes the first synchronization domain and the second synchronization domain.

In some feasible implementations, the base station on which supplementary detection is performed is a neighboring base station of at least one base station in the first synchronization domain, the at least one synchronization domain includes the first synchronization domain, and the base station on which supplementary detection is performed does not belong to any of the at least one synchronization domain.

In some feasible implementations, the processing module 301 is further configured to: determine an out-of-synchronization connection line in the at least one synchronization domain, where two synchronization domains connected through an out-of-synchronization connection line are in a relative clock out-of-synchronization relationship; determine a third synchronization domain that has a largest quantity of out-of-synchronization connection lines in the at least one synchronization domain; and make the base station in the second synchronization domain out of service.

It should be noted that because content such as information exchange between the modules/units of the apparatus and the execution processes thereof is based on a same concept as the method embodiments of this application, technical effects brought are the same as those of the method embodiments of this application. For specific content, refer to the descriptions in the foregoing method embodiments of this application. Details are not described herein again.

An embodiment of this application further provides a computer storage medium. The computer storage medium stores a program. The program is executed to perform some or all of the steps recorded in the method embodiments.

The following describes another communication apparatus according to an embodiment of this application. Refer to FIG. 4. A communication apparatus 400 includes:

a receiver 401, a transmitter 402, a processor 403, and a memory 404. In some embodiments of this application, the receiver 401, the transmitter 402, the processor 403, and the memory 404 may be connected through a bus or in another manner, and an example in which the bus is used for connection is described in FIG. 4.

The memory 404 may include a read-only memory and a random access memory, and provide instructions and data to the processor 403. A part of the memory 404 may further include a non-volatile random access memory (NVRAM). The memory 404 stores an operating system and operation instructions, an executable module, or a data structure, or a subset thereof, or an extended set thereof. The operation instructions may include various operation instructions used to implement various operations. The operating system may include various system programs, to implement various basic services and process a hardware-based task.

The processor 403 controls an operation of the communication apparatus 400, and the processor 403 may also be referred to as a central processing unit (CPU). In a specific application, components of the communication apparatus 400 are coupled together by using a bus system. In addition to a data bus, the bus system may include a power supply bus, a control bus, a status signal bus, and the like. However, for clear description, various types of buses in the figure are referred to as the bus system.

The method described in embodiments of this application may be applied to the processor 403, or may be implemented by the processor 403. The processor 403 may be an integrated circuit chip and has a signal processing capability. In an implementation process, steps in the method may be implemented by using a hardware integrated logical circuit in the processor 403, or by using instructions in a form of software. The processor 403 may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. The steps of the method disclosed with reference to embodiments of this application may be directly performed by a hardware coding processor, or may be performed by using a combination of hardware in the coding processor and a software module. The software module may be located in a mature storage medium in the art, for example, a random access memory, a flash memory, a read-only memory, a programmable read-only memory, an electrically erasable programmable memory, or a register. The storage medium is located in the memory 404, and the processor 403 reads information in the memory 404 and completes the steps in the method in combination with hardware of the processor.

The receiver 401 may be configured to: receive input digit or character information, and generate a signal input related to a related setting and function control of the communication apparatus. The transmitter 402 may include a display device like a display. The transmitter 402 may be configured to output digit or character information through an external interface.

In embodiments of this application, the processor 403 is configured to perform the out-of-synchronization base station determining method performed by the communication apparatus 400.

In another possible design, when the communication apparatus 400 is a chip, the communication apparatus 400 includes a processing unit and a communication unit. The processing unit may be, for example, a processor, and the communication unit may be, for example, an input/output interface, a pin, or a circuit. The processing unit may execute computer-executable instructions stored in a storage unit, so that the chip in the terminal performs the wireless report information sending method according to any one of the possible implementations of the first aspect. Optionally, the storage unit is a storage unit in the chip, for example, a register or a cache. Alternatively, the storage unit may be a storage unit that is in the terminal and that is located outside the chip, for example, a read-only memory (ROM) or another type of static storage device that may store static information and instructions, for example, a random access memory (RAM).

The processor mentioned anywhere above may be a general-purpose central processing unit, a microprocessor, an ASIC, or one or more integrated circuits configured to control program execution of the methods.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. In addition, in the accompanying drawings of the apparatus embodiments provided by this application, connection relationships between modules indicate that the modules have communication connections with each other, which may be specifically implemented as one or more communications buses or signal cables.

Based on the descriptions of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, or a network device) to perform the methods described in embodiments of this application.

All or some of the foregoing embodiments may be implemented by using software, hardware, firmware, or any combination thereof. When software is used to implement embodiments, all or a part of embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A base station determining method, comprising:

determining at least one synchronization domain, wherein any two neighboring base stations in the synchronization domain are in relative clock synchronization relationships;

determining a first synchronization domain based on the at least one synchronization domain, wherein each base station in the first synchronization domain is a synchronization base station; and determining a second synchronization domain that is in the at least one synchronization domain and that has a relative clock out-of-synchronization relationship with the first synchronization domain, wherein each base station in the second synchronization domain is an out-of-synchronization base station;

wherein determining the first synchronization domain based on the at least one synchronization domain comprises:

determining, based on the at least one synchronization domain, the first synchronization domain in which a proportion of a sum of base station weights in an extended connection domain in which the first synchronization domain is located is greater than a preset proportion, wherein the sum of base station weights is a sum of weights of all base stations in the synchronization domain, the extended connection domain comprises an air interface connection domain and the plurality of neighboring station connection domains, the air interface connection domain comprises at least one base station, and any two base stations in the air interface connection domain are capable of directly or indirectly communicating with each other.

2. The method according to claim 1, wherein the method further comprises:

receiving interference events reported by a plurality of base stations to obtain an interference event set;

determining a plurality of to-be-detected base stations and neighboring base stations of the base stations in a plurality of neighboring station connection domains based on the interference event set, wherein the neighboring station connection domain comprises base stations that report interference events and neighboring base stations of the base stations; and detecting at least one of a relative clock synchronization relationship or a relative clock out-of-synchronization relationship between each of the plurality of to-be-detected base stations and a neighboring base station of the base station to obtain a set of the relative clock synchronization/out-of-synchronization relationships between the plurality of base stations; and wherein the determining at least one synchronization domain comprises:

determining the at least one synchronization domain based on a relative clock synchronization/out-of-synchronization relationship set.

3. The method according to claim 2, wherein the determining the at least one synchronization domain based on the relative clock synchronization/out-of-synchronization relationship set comprises:

determining, based on the relative clock synchronization/out-of-synchronization relationship set, that two base stations that have a relative clock synchronization relationship belong to a same synchronization domain; and determining, based on the relative clock synchronization/out-of-synchronization relationship set, that two base stations that have a relative clock out-of-synchronization relationship belong to different synchronization domains.

4. The method according to claim 3, wherein the method further comprises:

if a base station a and a base station b that have a relative clock out-of-synchronization relationship exist in one synchronization domain, and the base station a and the base station b are neighboring base stations, performing station splitting on the base station a to obtain a physical base station a and a virtual base station a;

using the virtual base station a as a neighboring base station of the physical base station a and a neighboring base station of the base station b; and releasing a relationship between the base station a and the base station b as neighboring base stations.

5. The method according to claim 1, wherein the method further comprises:

if there is no synchronization domain in which a proportion of a sum of base station weights is greater than the preset proportion in the at least one synchronization domain, determining a base station on which supplementary detection is performed and a neighboring base station of the base station; and at least one of combining or extending the at least one synchronization domain based on the base station on which supplementary detection is performed and the neighboring base station of the base station.

6. The method according to claim 5, wherein the base station on which supplementary detection is performed is a base station in the first synchronization domain, at least one neighboring base station of the base station on which supplementary detection is performed is in the second synchronization domain, and the at least one synchronization domain comprises the first synchronization domain and the second synchronization domain.

7. The method according to claim 5, wherein the base station on which supplementary detection is performed is a neighboring base station of at least one base station in the first synchronization domain, the at least one synchronization domain comprises the first synchronization domain, and the base station on which supplementary detection is performed does not belong to any of the at least one synchronization domain.

8. The method according to claim 1, wherein the method further comprises:

determining an out-of-synchronization connection line in the at least one synchronization domain, wherein two synchronization domains connected through an out-of-synchronization connection line are in a relative clock out-of-synchronization relationship;

determining a third synchronization domain that has a largest quantity of out-of-synchronization connection lines in the at least one synchronization domain; and making the base station in the second synchronization domain out of service.

9. A server, comprising at least one processor, a memory, and a communication interface, wherein:

the at least one processor is coupled to the memory and the communication interface; and the memory is configured to store instructions for execution by the at least one processor to:

determine at least one synchronization domain, wherein any two neighboring base stations in the synchronization domain are in a relative clock synchronization relationship;

determine a first synchronization domain based on the at least one synchronization domain, wherein each base station in the first synchronization domain is a synchronization base station; and determine a second synchronization domain that is in the at least one synchronization domain and that has a relative clock out-of-synchronization relationship with the first synchronization domain, wherein each base station in the second synchronization domain is an out-of-synchronization base station;

wherein determining the first synchronization domain based on the at least one synchronization domain comprises:

determining, based on the at least one synchronization domain, the first synchronization domain in which a proportion of a sum of base station weights in an extended connection domain in which the first synchronization domain is located is greater than a preset proportion, wherein the sum of base station weights is a sum of weights of all base stations in the synchronization domain, the extended connection domain comprises an air interface connection domain and the plurality of neighboring station connection domains, the air interface connection domain comprises at least one base station, and any two base stations in the air interface connection domain are capable of directly or indirectly communicating with each other.

10. The server according to claim 9, wherein:
the communication interface is configured to receive interference events reported by a plurality of base stations to obtain an interference event set; and
the instructions, when executed, cause the at least one processor to:
determine a plurality of to-be-detected base stations and neighboring base stations of the to-be-detected base stations in a plurality of neighboring station connection domains based on the interference event set, wherein the neighboring station connection domain comprises base stations that report interference events and neighboring base stations of the base stations;
detect at least one of a relative clock synchronization relationship or a relative clock out-of-synchronization relationship between each of the plurality of to-be-detected base stations and a neighboring base station of the base station to obtain a set of the relative clock synchronization/out-of-synchronization relationships between the plurality of base stations; and
determine the at least one synchronization domain based on a relative clock synchronization/out-of-synchronization relationship set.

11. The server according to claim 10, wherein the instructions, when executed, cause the at least one processor:
determine, based on the relative clock synchronization/out-of-synchronization relationship set, that two base stations that have a relative clock synchronization relationship belong to a same synchronization domain; and
determine, based on the relative clock synchronization/out-of-synchronization relationship set, that two base stations that have a relative clock out-of-synchronization relationship belong to different synchronization domains.

12. The server according to claim 11, wherein the instructions, when executed, cause the at least one processor to:
if a base station a and a base station b that have a relative clock out-of-synchronization relationship exist in one synchronization domain, and the base station a and the base station b are neighboring base stations, perform station splitting on the base station a to obtain a physical base station a and a virtual base station a;
use the virtual base station a as a neighboring base station of the physical base station a and a neighboring base station of the base station b; and
release a relationship between the base station a and the base station b as neighboring base stations.

13. The server according to claim 9, wherein the instructions, when executed, cause the at least one processor to:
if there is no synchronization domain in which a proportion of a sum of base station weights is greater than the preset proportion in the at least one synchronization domain, determine a base station on which supplementary detection is performed and a neighboring base station of the base station; and
at least one of combine or extend the at least one synchronization domain based on the base station on which supplementary detection is performed and the neighboring base station of the base station.

14. The server according to claim 13, wherein the base station on which supplementary detection is performed is a base station in the first synchronization domain, at least one neighboring base station of the base station on which supplementary detection is performed is in the second synchronization domain, and the at least one synchronization domain comprises the first synchronization domain and the second synchronization domain.

15. The server according to claim 13, wherein the base station on which supplementary detection is performed is a neighboring base station of at least one base station in the first synchronization domain, the at least one synchronization domain comprises the first synchronization domain, and the base station on which supplementary detection is performed does not belong to any of the at least one synchronization domain.

16. The server according to claim 9, wherein the instructions, when executed, cause the at least one processor to:
determine an out-of-synchronization connection line in the at least one synchronization domain, wherein two synchronization domains connected through an out-of-synchronization connection line are in a relative clock out-of-synchronization relationship;
determine a third synchronization domain that has a largest quantity of out-of-synchronization connection lines in the at least one synchronization domain; and
make the base station in the second synchronization domain out of service.

17. A non-transitory computer-readable storage medium, wherein the non-transitory computer-readable storage medium stores at least one program, and the at least one program enables a computer device to:
determine at least one synchronization domain, wherein any two neighboring base stations in the synchronization domain are in relative clock synchronization relationships;
determine a first synchronization domain based on the at least one synchronization domain, wherein each base station in the first synchronization domain is a synchronization base station; and
determine a second synchronization domain that is in the at least one synchronization domain and that has a relative clock out-of-synchronization relationship with the first synchronization domain, wherein each base station in the second synchronization domain is an out-of-synchronization base station;
wherein determining the first synchronization domain based on the at least one synchronization domain comprises:
determining, based on the at least one synchronization domain, the first synchronization domain in which a proportion of a sum of base station weights in an extended connection domain in which the first synchronization domain is located is greater than a preset proportion, wherein the sum of base station weights is a sum of weights of all base stations in the synchronization domain, the extended connection domain comprises an air interface connection domain and the plurality of neighboring station connection domains, the air interface connection domain comprises at least one base station, and any two base stations in the air interface connection domain are capable of directly or indirectly communicating with each other.

18. The non-transitory computer-readable storage medium according to claim 17, wherein the at least one program further enables the computer device to:
receive interference events reported by a plurality of base stations to obtain an interference event set;
determine a plurality of to-be-detected base stations and neighboring base stations of the base stations in a plurality of neighboring station connection domains based on the interference event set, wherein the neighboring station connection domain comprises base stations that report interference events and neighboring base stations of the base stations; and detect at least one of a relative clock synchronization relationship or a relative clock out-of-synchronization relationship between each of the plurality of to-be-detected base stations and a neighboring base station of the base station to obtain a set of the relative clock synchronization/out-of-synchronization relationships between the plurality of base stations; and the determining at least one synchronization domain comprises:

determining the at least one synchronization domain based on a relative clock synchronization/out-of-synchronization relationship set.

19. The non-transitory computer-readable storage medium according to claim 18, wherein determining the at least one synchronization domain based on the relative clock synchronization/out-of-synchronization relationship set comprises:

determining, based on the relative clock synchronization/out-of-synchronization relationship set, that two base stations that have a relative clock synchronization relationship belong to a same synchronization domain; and determining, based on the relative clock synchronization/out-of-synchronization relationship set, that two base stations that have a relative clock out-of-synchronization relationship belong to different synchronization domains.

20. The non-transitory computer-readable storage medium according to claim 19, wherein the at least one program enables the computer device to:

if a base station a and a base station b that have a relative clock out-of-synchronization relationship exist in one synchronization domain, and the base station a and the base station b are neighboring base stations, perform station splitting on the base station a to obtain a physical base station a and a virtual base station a;

use the virtual base station a as a neighboring base station of the physical base station a and a neighboring base station of the base station b; and release a relationship between the base station a and the base station b as neighboring base stations.

* * * * *